Feb. 8, 1938. E. D. TILLYER 2,107,553
OPHTHALMIC INSTRUMENT
Filed July 29, 1935
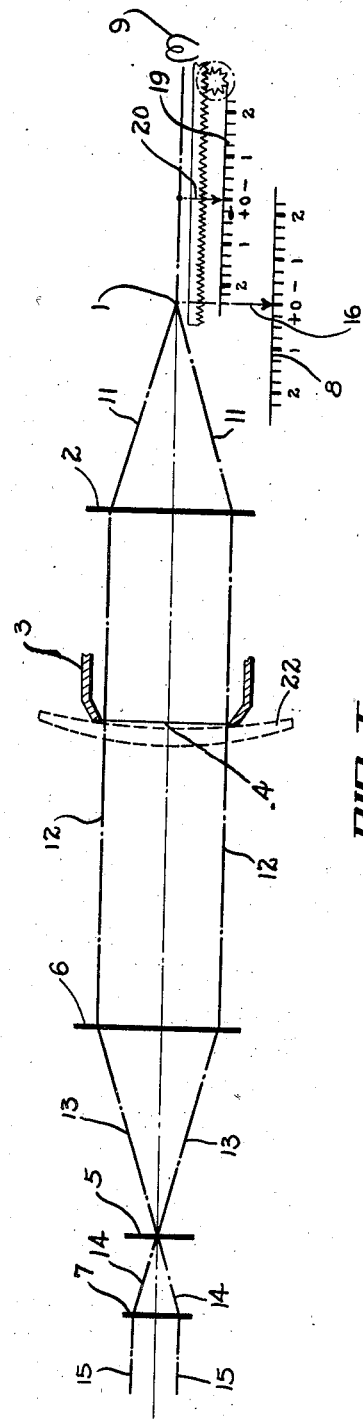
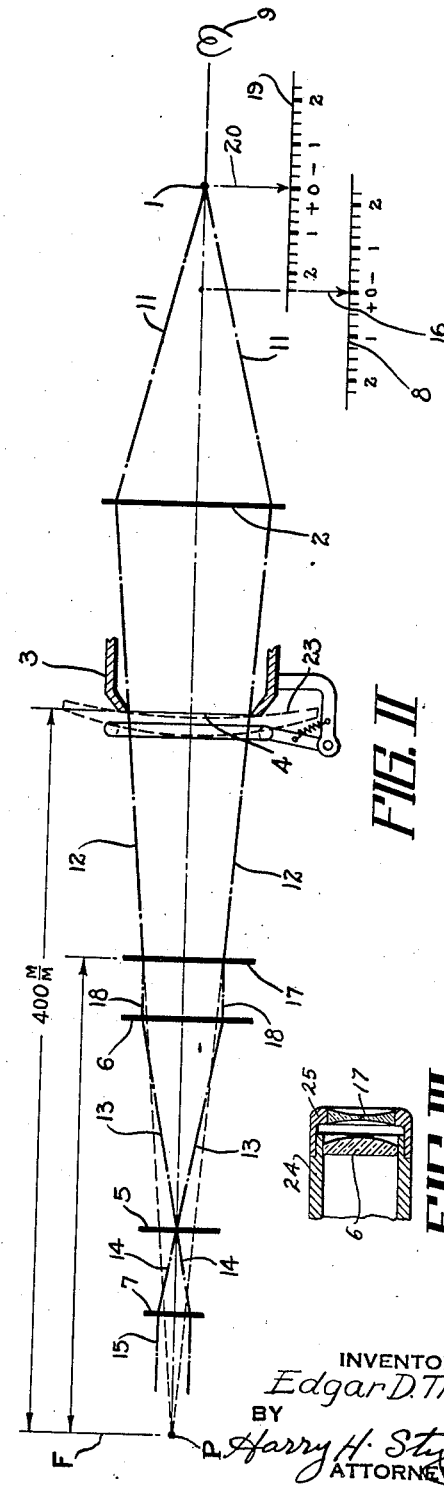
INVENTOR
Edgar D. Tillyer
BY
Harry H. Still
ATTORNEY Patented Feb. 8, 1938

2,107,553

UNITED STATES PATENT OFFICE 2,107,553

OPHTHALMIC INSTRUMENT

Edgar D. Tillyer, Southbridge, Mass., assignor to American Optical Company, Southbridge, Mass., a voluntary association of Massachusetts Application July 29, 1935, Serial No. 33,738

10 Claims. (Cl. 88—56)

This invention relates to improvements in ophthalmic instruments and has particular reference to improved means and method of determining the focal powers of lenses or lens systems for certain distances less than the so called distant object.

One of the principal objects of the invention is to provide improved means and method of determining the focal powers of lenses or lens systems at a distance less than infinity.

Another object is to provide improved means and method of determining the powers of reading lenses, and the reading field of multifocal lenses by altering the direction of the light rays utilized in obtaining the distance powers.

Another object is to provide an attachment for a standard lens measuring instrument of the type used for obtaining the focal powers of distant vision lenses whereby the said instrument may be altered to obtain the accurate focal powers of lenses, and lens systems at other distances and particularly the standard reading distance.

Other objects and advantages of the invention will become apparent from the following description taken in connection with the accompanying drawing, and it will be apparent that many changes may be made in the details of construction, arrangement of parts, and steps of the method shown and described, without departing from the spirit of the invention as expressed in the accompanying claims. I, therefore, do not wish to be limited to the exact details shown and described, as the preferred form and method only have been shown and described by way of illustration.

Referring to the drawing:

Fig. I is a diagrammatic view of an instrument of the type embodying the invention adjusted for testing lenses for distance vision; and, Fig. II is a view similar to Fig. I showing the instrument adjusted for testing lenses at standard reading distance, and illustrating one of the basic features of the invention.

Fig. III is a sectional view of a device for supporting an auxiliary lens on a lens testing instrument.

In the past, in testing the powers of refraction of lenses, it has been usual to utilize an instrument whereby the power of the lens has been determined by parallel light rays equivalent to light rays proceeding from an infinitely distant object. A disclosure of such an instrument will be found in Patent Numbers 1,281,717 to C. J. Troppman; 1,542,112 to E. D. Tillyer and 1,556,550 to E. D. Tillyer.

It has been common practice in the past to use such an instrument for testing the powers of refraction of both distant and near vision lenses. Although this type of instrument provided an accurate test when determining the focal powers of lenses or lens systems used for correcting distant vision, wherein the light rays in actual use were parallel when entering the lens or lens system, it was found that such an instrument was not accurate for determining the powers of refraction of near vision lenses, because parallel light rays such as used by the instrument and such as exist when looking at an infinitely distant object, do not come from an object at reading distance from the lens. The rays from an object at reading distance diverge and do not become essentially parallel.

The present invention is, therefore, based upon the provision of means in a lens measuring instrument of the parallel ray type for causing said rays, when measuring the focal power of a lens as used at reading distance, to traverse the lens at the same angles of incidence to the surfaces that they would traverse said surfaces if the lens were in use before the eye at any desired or assumed reading distance.

In order to more comprehensively set forth the present invention, it might be well to bring out the fact that an object such as print, etc. is normally held from approximately ten to twenty inches from the eyes, while reading. This is usually expressed as being from one-quarter to one-half a meter distance, and for an average value, the distance of four-tenths of a meter has been adopted. This leads to the use of a plus 2.50 diopter lens for reading addition above the power used for the correction of distance vision. This plus 2.50 diopter lens can be considered as a tiny, thin imaginary lens put immediately in front of a thin imaginary distance lens, so that it will render parallel the divergent rays of light coming from the object at four-tenths of a meter or the assumed reading distance from the eye. Actually the lenses to be tested are not thin and imaginary. These parallel rays of light then enter the imaginary distance lens and are rendered of the right vergence to obtain a sharp image on the retina of the eye. Obviously, if we let parallel light fall on this little imaginary lens, such as happens when measuring near vision lenses with prior art measuring instruments of the parallel ray type, we will have the light converging as it enters the actual distance lens and we will read on such a measuring instrument a focal value other than the correct one. This is due to the difference in the direction of the light rays passing through the lens. For a very weak distance lens, that is, a thin lens, the difference will be substantially negligible, but for a strong thick distance lens the difference will be of a relatively large value. Therefore, in order to accurately measure near vision lenses the light rays in the test instrument must be changed from parallelism prior to entering the lens by an amount substantially equal to the divergence of light rays coming from an object at reading distance or in the reverse direction over the same path.

Referring more particularly to the drawing and to the method by which the above result is obtained, there is shown in Fig. I a diagrammatic view of a parallel ray type of instrument showing the lens system and the path of light rays from the test object to the eyepiece of the instrument. This instrument comprises broadly a test target or object 1 normally located in the principal focal plane of a standard lens system 2. Aligned with this standard lens system is a nose 3 formed with a lens supporting edge 4, the plane of which is located in the opposite principal focal plane of said standard lens system. In alignment with the standard lens system and nose 3 is a telescope objective 6 and a reticule 5 adapted to receive an image of the test target 1 which is projected by said telescope objective. A suitable eyepiece 7 is provided for viewing the image on the reticule and a source of illumination 9 is provided to illuminate the test target 1.

When the various elements of the instrument, as shown in Fig. I, are in proper adjusted relation with each other, with no lens to be tested in position on the nose 3 of the instrument, the test target 1 is located at the principal focal plane of the standard lens system 2 or at zero position relative to a dioptic scale 8 provided on the instrument for determining the powers of the lenses to be tested by said instrument. Light rays coming from the source of illumination 9 are adapted to illuminate the test target 1 and are adapted to diverge, as illustrated at 11, from said test object to be received by the standard lens system 2, wherein they are projected parallel through the nose 3 of the instrument. These parallel rays are illustrated at 12, and are adapted to be received by the telescope objective 6 wherein the said rays are focused, as illustrated at 13, on the reticule 5 of the instrument. The rays coming from the reticule, as indicated at 14, are received by the eye piece 7 and enter the eye of the observer as nearly parallel light 15. It is to be understood that the light rays in all instruments of this character must be parallel when entering the telescope objective 6 in order to obtain a clear image of the test target 1 on the reticule 5. The adjustment described above gives a uniform power scale 8 as shown.

The function and use of the instrument is as follows:

The function of the instrument and the path of the light rays through the lens under test will perhaps be more easily understood if it is borne in mind that the adjustable test target 1 is for convenience preferably located on the eyeside of the lens under test, as this arrangement enables the eye piece 7 to be held stationary while the image of the target 1 is adjusted into focus on the reticule by varying the position of the test target 1 relative to the scale means 8 by which the power of the lens is determined. The target 1 could, however, be fixed in the telescope 6 and the reticule 5 could be located at the present position of the test target 1 with the eye piece 7 located adjacent the reticule, but with this arrangement it would be necessary to move the eye piece and reticule back and forth to bring the image of the test target into focus and would be very inconvenient to the operator.

The lens to be tested, as shown diagrammatically at 22, is placed on the nose 3 of the instrument with its ocular surface engaging and lying in the plane of the lens supporting edge 4. The power of the lens, plus or minus as the case may be, causes the normally parallel light rays 12 to converge or diverge towards the telescope objective 6, wherein no image, or only a blurred image, of the test target 1 will be visible on the reticule 5 of the instrument. The test target 1 is then adjusted back and forth longitudinally of the scale 8 until a clear image of the test target appears on the reticule. This adjustment is to obtain a position wherein the converging or diverging light rays 12 will again be rendered parallel when entering the telescope objective and will produce a clear cut image of the test target 1 on the reticule. The amount of movement required to bring about this result, as determined by reading the departure of the indicator 16 from the zero position of the scale 8 indicates the power of the lens under test, the plus power being indicated in one direction and the minus power in the opposite direction of the scale.

It will be seen that with the above type of instrument wherein parallel light rays 12 are employed to determine the power of the lens under test, the said lens is tested as in actual use when looking at a distant object, that is, with light rays coming to the lens substantially parallel as from an infinitely distant object, that is a distant object in place of the telescope.

As set forth above, this test, although accurate for distance lenses, is not accurate for determining the focal power of near vision lenses, as the light rays coming from a near object during actual use of the lens, for example, at reading distance, diverge when entering the lens. In order, therefore, to obtain an accurate measurement of such near vision lenses or lens systems with an instrument of the above character, the said instrument must be provided with some means for altering the light rays 12 so that they will be angled substantially the same amount as light rays coming from a near object prior to being projected through the lens under test.

With this in mind, and as shown diagrammatically in Fig. II, the instrument is altered by first assuming a standard reading distance and establishing said distance as by the point P relative to the nose 3 of the instrument. This distance is here assumed to be approximately four hundred millimeters from the plane of the lens supporting edge 4. The instrument is next provided with a negative lens 17 whose focal length and position on the instrument relative to the edge 4 of the nose 3 or telescope objective 6 is such that its virtual focal plane F' coincides with the plane of P at said selected reading distance of four hundred millimeters from the edge 4 of the instrument. The power and position of this negative lens is such that it requires the test target 1 to be adjusted from its previous zero position as fixed by the scale 8 in Fig. I, by an amount sufficient to compensate for the power introduced by said negative lens, which lens in this particular instance is of approximately minus 2.50 diopters which is the reciprocal of 0.400 meters or 400 millimeters the assumed reading distance. This causes the light rays 12 to converge to the point P or to enter the lens under test at an angle substantially equal to the angle of divergence of the light rays coming from an object at reading distance, which distance in this particular instance is four hundred millimeters. It is to be understood that the power of the lens 17 may be varied as its power depends upon its position in the instrument and is changed accordingly. The negative lens 17 and scale 19 have been shown of such a power and position as to measure for a reading distance of four hundred millimeters from the ocular surface of the ophthalmic lens under test. Obviously, this lens 17 and scale 19 may be chosen so that any desired value of a standard reading distance can be used and likewise the reading position P may be changed. The negative lens 17 is adapted to receive the light rays 12 and render them parallel, as indicated at 18, prior to their entering the telescope objective 6, wherein the said rays will be rendered of the proper vergence by said objective to produce a clear cut image of the test target 1 on the reticule 5, in the same manner as that set forth above in the description of Fig. I. The position of the test target 1, when the instrument is adjusted as shown in Fig. II and with no test lens in position on the edge 4 of the instrument, is in this instance considered to be the zero setting of the instrument. Separate scale and indicator means, such as shown at 19 and 20, may be used or preferably separate indicator means relative to the scale 8 may be used to determine the power of the lens under test, these scales are uniformly spaced dioptric divisions.

To obtain the power of a near vision lens, the said lens is supported in the usual manner as shown diagrammatically at 23 with its ocular surface engaging the edge 4 of the nose of the instrument. The power of the said lens, plus or minus as the case may be, will cause the light rays 12 to be rendered more convergent or divergent than when there is no test lens in the instrument, causing no image or only a blurred image of the test means 1 to be visible on the reticule. The test target 1 is then adjusted back or forth relative to the scale 19 an amount sufficient to cause the rays 12 to again enter the negative lens 17 at the proper angle to be rendered parallel, as indicated at 18, prior to entering the telescope objective 6, whereby a clear cut image of the test target 1 will be formed on the reticule 5. The amount of movement of the test target along the scale 19, to one side or the other of the zero position, will indicate the actual power plus or minus, of the reading lens under test as when in actual use when reading.

If the lens is cylindrical or toric the power in the two major meridians is determined by adjustment of the test target 1 into focus in said meridians in the usual manner. It is to be understood that if it is desired to obtain the axis of the cylinder, suitable means such as is commonly known in the prior art may be provided. To aid in accomplishing the above results it is to be understood that the test target 1 is mounted so that it may be rotated about its center as the axis of rotation as well as its being adjustable longitudinally of the optical axis of the instrument.

By proper arrangement of the test lens supporting means 4 and the lens system of the instrument together with the scale and indicator means as set forth above, it is possible to use the lens 17 as an auxiliary attachment whereby the instrument may be quickly and easily changed from a distance vision lens testing instrument to a near vision lens testing instrument. To accomplish this result it is only necessary to provide a positional support 24 on the instrument with attaching means 25 on said support for holding the lens 17 in proper optical position on the instrument, as shown in Fig. III, and to next use the proper scale 19 and indicator 20 or another indicator and the same scale 8 when taking the power readings of the lens or lens system under test, it being understood that the instrument is so designed that this result may be accomplished.

It will be seen that the light rays illustrated at 12 in Fig. I, are parallel and are equivalent to rays coming from an infinitely distant object, while in Fig. II, when considered as coming from the object point P toward the lens, they will diverge when entering the front of the lens by an amount substantially equal to light rays coming from an object at reading distance. This arrangement, therefore, provides accurate means and method of testing both near and distant vision lenses as when in actual use when looking at a near or distant object.

Obviously, a lens system may be so arranged that the reticule 5 could be placed at a distance equal to the reading distance from the edge 4 of the lens supporting nose of the instrument and a positive lens could be inserted either at 17 or 6 so that its principal focal plane would be at the reticule 5. Then, when this positive lens is in place the optics of the instrument will be equivalent to those shown in the instrument at Fig. II without the negative lens 17, and with no lens— that is, neither 17 nor 6—in place the optics are the equivalent of the instrument with both 17 and 6 in place. This, however, is not so desirable as the preferred structure previously described.

It is equally obvious that instead of having the instrument commercially designed for testing lenses for a distant object and utilizing an attachment for altering the light rays of the instrument for testing lenses for a near object, the instrument can be designed primarily for testing lenses for a near object and an attachment can be provided for altering said near object testing instrument so that the instrument may be adapted for measuring the powers of lenses for distant objects.

From the foregoing it will be seen that simple, efficient, and novel means and method have been provided for obtaining accurate power measurements of lenses or lens systems under conditions of actual use.

Having described my invention, I claim:

1. In a lens testing instrument, a test object, a reticule, means having a lens supporting edge aligned with the test object and reticule, means for projecting an image of the test object longitudinally of the instrument and transversely of said lens supporting edge to a plane at a known assumed near distance from said lens supporting edge, lens means located in the path of the projected image of such a power that its virtual focal point will lie in the plane of the projected image at said known distance from the lens supporting edge, said lens being adapted to render the projected rays parallel, and means for receiving said parallel light rays and for bringing them to a focus on the reticule.

2. In an instrument of the character described, in combination with an illuminated test target, a reticule and a telescope objective for receiving parallel light from said target and for focusing an image of the target on the reticule, means having an edge for supporting a lens to be tested between the said telescope objective and the illuminated test target, means for projecting an image of the test target transversely of said edge to a plane at an assumed near distance from said edge, a negative lens system located between the lens support and telescope objective of such a power that its virtual focal point will lie in the near distance plane of the projected image, and means for bringing about equal variations in the separation between the test target and the lens support resulting from equal changes in the dioptric value of the lens under test, said equal changes being due to the fact that the image of the test target, when distinctly seen, is at the reticule plane whereby the optical vergence of light incident upon the lens under test may be altered to change the angle of the light rays delivered to the negative lens system by said lens under test by an amount substantially equal to the divergence of the light rays coming from an object at said assumed near distance from the eye, whereby the said light rays will be rendered parallel by said negative lens system prior to entering the telescope objective.

3. In an instrument for testing the power of lenses for a distant object embodying projected parallel light rays, means for supporting a lens to be tested in alignment with the parallel rays and a uniform dioptric scale, means for holding a lens to be tested on said lens support, means for supporting a negative lens system in the path of the light rays of the instrument for effecting an angular alteration thereof by an amount sufficient to cause the said rays to be angled substantially equal to the angle of the light rays coming from an object at an assumed distance other than infinity from the eye whereby the optical characteristics of the lens under test may be determined on said uniform dioptric scale under conditions similar to those which exist when looking at an object at said assumed distance from the eyes.

4. In combination with an instrument for testing the powers of lenses for a distant object embodying parallel rays simulating the rays coming from an object at infinity and a uniform dioptric scale for indicating the power of the lens as tested by said parallel rays, negative lens means for altering the direction of said rays and of such a power as to make the said rays vergent by an amount substantially equal to the angle of vergence of rays coming from an object at a known near distance for which it is desired to obtain the focal power of the lens for said near distance.

5. In an instrument for testing the power of a lens for a distant object embodying means for producing parallel light rays simulating the rays coming from an object at infinity, means for bringing about an altering of the vergence of the light rays by a controlled amount so that the said rays will simulate light rays coming from an object at a known near distance so related to said lens that the rays therefrom are divergent instead of parallel, means for producing a test image by said rays, means for viewing said test image and scale and indicator means for determining the power of said lens for said divergent rays.

6. A lens testing aparatus having in combination, image forming and projection means for projecting through a lens to be tested, rays of light of vergence substantially equal to the angle of vergence of light rays coming from an object at a known near distance for which it is desired to obtain the effective focal power, lens means for producing a test image by said rays, lens means for viewing said test image and an apparatus for measuring the focal power of a lens for said rays.

7. The method of testing the refractive action of a lens upon rays coming from an object at a known distance other than infinity from said lens and which are focused in an eyepiece to produce a visible test image, comprising intercepting the rays with the lens to be tested, adjusting the angle of the projected rays incident to one surface thereof to such an angle as to produce emergent rays from the other surface of said lens simulating the light rays coming from said object at said known distance and determining the relation between said incident and emergent rays in terms of dioptric power to determine the focal power of the lens for said distance.

8. The method of testing the refractive action of a lens on rays coming from an object at a known near distance from said lens comprising projecting a test image with parallel light rays and providing means for focusing said image in an eyepiece to produce a visible test image, intercepting the rays with the lens to be tested, adjusting said focusing means to change the angle of the rays incident to one surface of the lens upon which said lens will act to cause an angular relation between the incident and emergent rays substantially identical to that of rays coming from an object at said known near distance for which it is desired to determine the focal distance, and determining the change of position of said focusing means in terms of dioptric power to determine the focal power of the lens for said distance.

9. In an instrument for testing the power of a lens for a distant object embodying means for producing parallel light rays simulating the rays coming from an object at infinity, means for bringing about an altering of the vergence of the light rays by controlled amounts so that the said rays will simulate light rays coming from an object at a known near distance so related to said lens that the rays therefrom are divergent instead of parallel, means for producing a test image by said rays, means for viewing said test image and an apparatus for determining the power of said lens for said divergent rays.

10. A lens testing device having in combination, a projecting system embodying a source of illumination, a target and a standard lens for projecting, through a lens to be tested, rays of light of a vergence substantially equal to the angle of vergence of light rays coming from an object at a known near distance for which it is desired to obtain the effective focal power, an image forming lens system for producing a test image of said target, an optical system for viewing said image and an apparatus for measuring the focal power of a lens for said rays by changing the relative positions of some of the components of the projecting system.

EDGAR D. TILLYER.